(12) United States Patent
Zhang

(10) Patent No.: US 8,744,426 B2
(45) Date of Patent: Jun. 3, 2014

(54) PROFILE SWITCHING METHOD BASED ON MOBILE PHONE WIFI AND A MOBILE PHONE

(75) Inventor: Lei Zhang, Guangdong (CN)

(73) Assignee: Huizhou TCL Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 13/638,560

(22) PCT Filed: Aug. 29, 2011

(86) PCT No.: PCT/CN2011/079073
§ 371 (c)(1),
(2), (4) Date: Sep. 28, 2012

(87) PCT Pub. No.: WO2012/034478
PCT Pub. Date: Mar. 22, 2012

(65) Prior Publication Data
US 2013/0023262 A1 Jan. 24, 2013

(30) Foreign Application Priority Data
Sep. 17, 2010 (CN) .......................... 2010 1 0285317

(51) Int. Cl.
*H04M 3/493* (2006.01)
*H04W 24/00* (2009.01)
*H04W 4/00* (2009.01)
*H04W 64/00* (2009.01)
*H04M 1/725* (2006.01)

(52) U.S. Cl.
CPC .......... *H04W 64/00* (2013.01); *H04M 1/72572* (2013.01); *H04W 24/00* (2013.01)
USPC ..................... 455/418; 455/414.2; 455/456.3; 370/338

(58) Field of Classification Search
CPC .......................... H04W 64/00; H04M 1/72572

USPC ................ 455/418, 456, 414.2, 456.1–456.6, 455/414.1; 726/7; 370/328, 338; 340/5.1, 340/5.2
See application file for complete search history.

(56) References Cited

U.S. PATENT DOCUMENTS

| 7,426,197 B2 * | 9/2008 | Schotten et al. ............... 370/328 |
| 2004/0235464 A1 | 11/2004 | Korkalo et al. |
| 2007/0189241 A1 * | 8/2007 | Zhang ........................... 370/338 |

(Continued)

FOREIGN PATENT DOCUMENTS

| CN | 101150821 A | 3/2008 |
| CN | 101340686 A | 1/2009 |

(Continued)

OTHER PUBLICATIONS

International Search Report mailed Dec. 1, 2011 for PCT/CN2011/079073, citing the above reference(s).

*Primary Examiner* — Nizar Sivji
(74) *Attorney, Agent, or Firm* — Lowe Hauptman & Ham, LLP

(57) ABSTRACT

The present invention relates to a field of mobile communication, a profile adjusting method based on mobile phone WIFI is disclosed herein. An acquired SSID of the WLAN is compared with a pre-stored SSID, when the acquired SSID of the WLAN and the pre-stored SSID are determined to be the same, a user is prompted and the profile of the mobile phone which corresponds to the pre-stored SSID is activated. The profile switching method based on mobile phone WIFI provided in the present invention utilizes the existing mobile phone WIFI under the control of the mobile phone software to prompt that the user's mobile phone is in different locations based on the different WIFI connecting statuses, and automatically switching the profiles which correspond to locations which are pre-set by the user is achieved, as well as the user is provided convenience.

5 Claims, 3 Drawing Sheets

(56) References Cited

U.S. PATENT DOCUMENTS

2009/0064299 A1* 3/2009 Begorre et al. .................. 726/7
2009/0262673 A1   10/2009 Hermersdorf
2011/0217968 A1   9/2011 Korkalo et al.

FOREIGN PATENT DOCUMENTS

| CN | 101815122 A | 8/2010 |
|----|-------------|--------|
| CN | 101959321 A | 1/2011 |

* cited by examiner

PROFILE SWITCHING METHOD BASED ON MOBILE PHONE WIFI AND A MOBILE PHONE

CROSS REFERENCE TO RELATED APPLICATION

This application claims the priority of Chinese Patent Application No. 201010285317.6, filed on Sep. 17, 2010 in the SIPO (State Intellectual Property Office of the P.R.C). Further, this application is the National Phase application of International Application No. PCT/CN2011/079073 filed Aug. 29, 2011, which designates the United States and was published in Chinese.

TECHNICAL FIELD OF THE INVENTION

The present invention relates to a field of mobile communication, more particularly to a profile switching method based on mobile phone WIFI (wireless fidelity) and a mobile phone.

BACKGROUND OF THE INVENTION

With the developments of the mobile communication and improvement of people's living standards, the utilization of the mobile communication is more and more popularized.

Currently, many mobile phones in the market have a WIFI (wireless fidelity) function, in general, a user may connect to a wireless local area network (WLAN), or access the local area network, and be on the Internet.

But there is no location labeling function to be performed through the mobile phone WIFI which is built in the existing mobile phones, so it is disadvantageous for the mobile phones to switch automatically to corresponding profiles by utilizing the different locations.

Therefore, there is a need for an improvement and development to solve the existing problems in the prior art.

SUMMARY OF THE INVENTION

An objective of the present invention is to solve the above-mentioned defects by providing a profile switching method based on mobile phone WIFI and a mobile phone, and the mobile phone is added a new function which can utilize the mobile phone WIFI to acquire different location labels for switching to corresponding profiles. That is, when the mobile phone is in different locations, automatically switching the profiles which correspond to locations which is pre-set by a user is achieved, and the user is provided convenience.

In order to solve the above-mentioned problem, the present invention provides a technical solution as follows:

A profile switching method based on mobile phone WIFI comprises steps of:

A. pre-store an SSID (service set identifier) of a WLAN (wireless local area network) which corresponds to a specified location, and store a profile of the mobile phone which corresponds to the SSID of the specified location;

B. search a WLAN in the vicinity at designated times through the mobile phone WIFI, and acquire the SSID of the WLAN;

C. compare the acquired SSID of the WLAN and the pre-stored SSID, when the acquired SSID of the WLAN and the pre-stored SSID are determined to be the same, prompt the a user and activating the profile of the mobile phone which corresponds to the pre-stored SSID.

The profile switching method based on mobile phone WIFI, such that the step A particularly comprises:

A1. search the SSID of the WLAN which corresponds to the specified location through the mobile phone WIFI, and store the SSID of the WLAN;

A2. activate a location labeling function as required, and annotate a name of the specified location which corresponds to the SSID of the WLAN;

A3. set and store the profile of the mobile phone which corresponds to the name of the specified location of the SSID as required.

The profile switching method based on mobile phone WIFI, such that setting the profile of the mobile phone comprises setting a ring tone, volume, and a vibration mode.

The profile switching method based on mobile phone WIFI, such that the step C further comprises: when the acquired SSID of the WLAN and the pre-stored SSID are determined to be different, prompting and switching of the profile of the mobile phone are not activated.

A mobile phone comprises:

a first storage module, which is utilized for pre-storing an SSID of a WLAN corresponding to a specified location;

a second storage module, which is utilized for storing a profile of the mobile phone corresponding to an SSID of the specified location;

a WIFI module, which is utilized for searching a WLAN in the vicinity at designated times through the mobile phone WIFI, and acquiring the SSID of the WLAN;

a profile switching module, which is utilized for comparing the acquired SSID of the WLAN and the pre-stored SSID and prompting a user and activating the profile of the mobile phone corresponding to the pre-stored SSID when the acquired SSID of the WLAN and the pre-stored SSID are determined to be the same.

The mobile phone further comprises:

a location labeling module, which is utilized for activating a location labeling function as required, and annotating a name of the specified location corresponding to the SSID of the WLAN.

The mobile phone further comprises:

a setting module, which is utilized for setting and storing the profile of the mobile phone corresponding to the name of the specified location of the SSID as required.

The profile switching method based on mobile phone WIFI provided in the present invention utilizes the existing mobile phone WIFI under the control of the mobile phone software to prompt that the user's mobile phone is in different locations based on the different WIFI connecting statuses, and automatically switching the profiles which correspond to locations which is pre-set by the user is achieved, as well as the user is provided convenience. So that the mobile phone is added a new function, i.e. profile switching method, which can utilize the mobile phone WIFI to acquire different location labels for switching to corresponding profiles.

DETAILED DESCRIPTION OF THE INVENTION

The present invention provides a profile switching method based on mobile phone WIFI and a mobile phone. To make the objectives, technical schemes, and advantages of the present invention more clear, the present invention will be described in detail as follows in conjunction with drawings and embodiments. It should be understood that the embodiments described herein are merely used for interpreting the present invention, but the present invention is not limited thereto.

Figure 1:
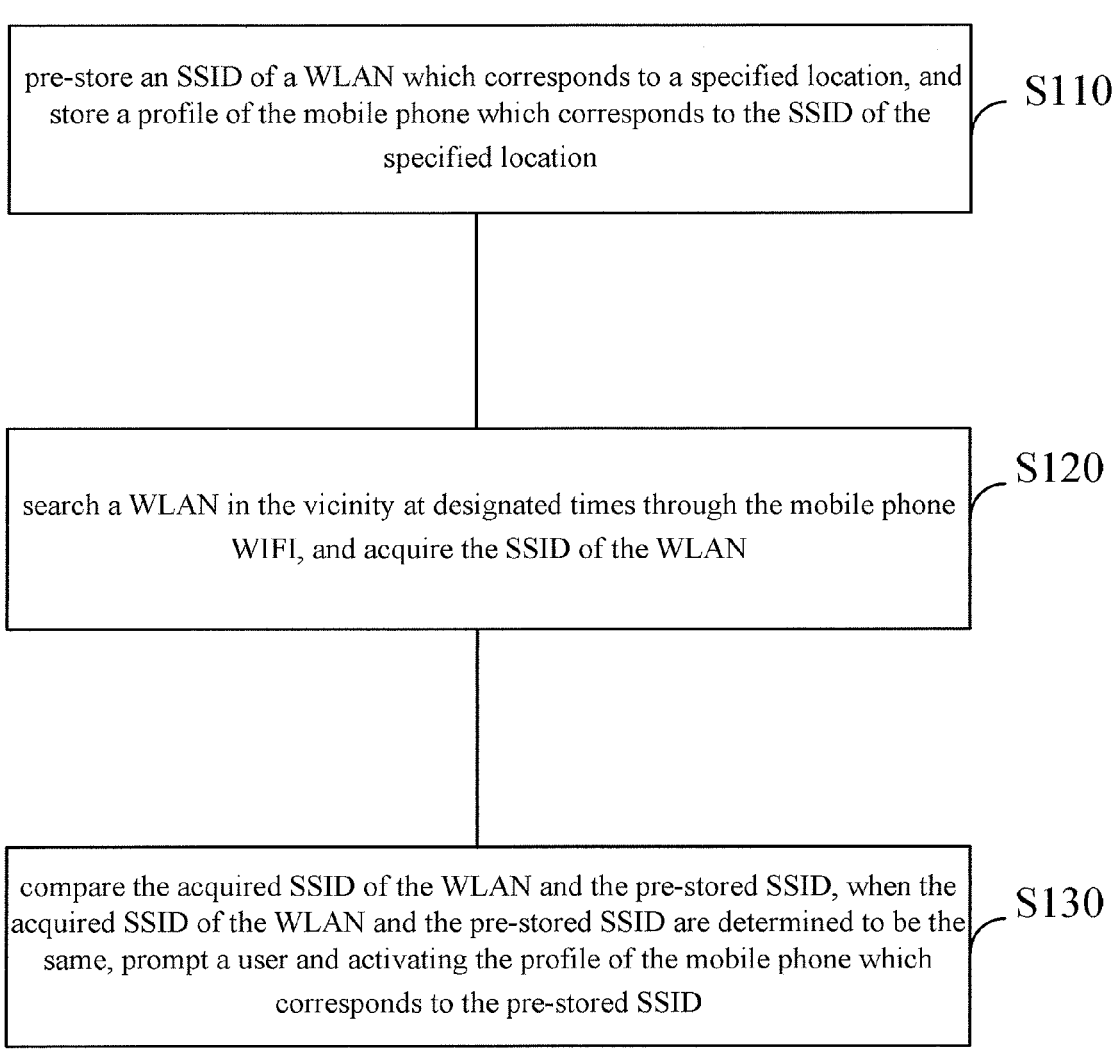
FIG. 1. is a flow chart of a profile switching method based on mobile phone WIFI in accordance with a preferred embodiment of the present invention.

One preferred embodiment of the present invention involves a profile switching method based on mobile phone WIFI. As shown in FIG. 1, the profile switching method based on mobile phone WIFI comprises steps as follows:

Step S110. an SSID (service set identifier) of a WLAN (wireless local area network) which corresponds to a specified location is pre-stored, and a profile of the mobile phone which corresponds to the SSID of the specified location is stored.

Step 110 further comprises steps as follows: A1. the SSID of the WLAN which corresponds to the specified location through the mobile phone WIFI is searched, and the SSID of the WLAN is stored; A2. a location labeling function is activated as required, and a name of the specified location which corresponds to the SSID of the WLAN is annotated; A3. the profile of the mobile phone which corresponds to the name of the specified location of the SSID is set and stored as required.

An SSID is an abbreviation for Service Set Identifier, the technique of the SSID may divide a WLAN into several subnets, and the subnets require different authentications, such that each subnet requires an independent authentication and only the user with matching authentication is permitted to access the corresponding subnet, thereby preventing the user with non-matching authentication to access the subnet.

The SSID, which may comprise ESSID (extended service set identifier), is utilized for distinguishing the different networks, and can contain 32 characters at most. The wireless network card which is set with the different SSIDs may access different networks correspondingly. The SSID is usually broadcasted by an access point (AP), the SSID of a current local area may be searched out by a built-in scanning function in Windows XP. It is possible that the SSID is not broadcasted based on safety consideration, at this time, the user has to set the SSID manually to access the corresponding network. Simply speaking, the SSID is a name of a local area network (LAN), only the computers which are set with the same name of the SSID may communicate with each other.

Step S120. a WLAN in the vicinity is searched at designated times through the mobile phone WIFI, and the SSID of the WLAN is acquired;

Step S130. the acquired SSID of the WLAN is compared with the pre-stored SSID, when the acquired SSID of the WLAN and the pre-stored SSID are determined to be the same, the user is prompted and the profile of the mobile phone which corresponds to the pre-stored SSID is activated.

The profile switching method based on mobile phone WIFI of the present invention will be further described through a practical embodiment in detail as follows.

Figure 2:
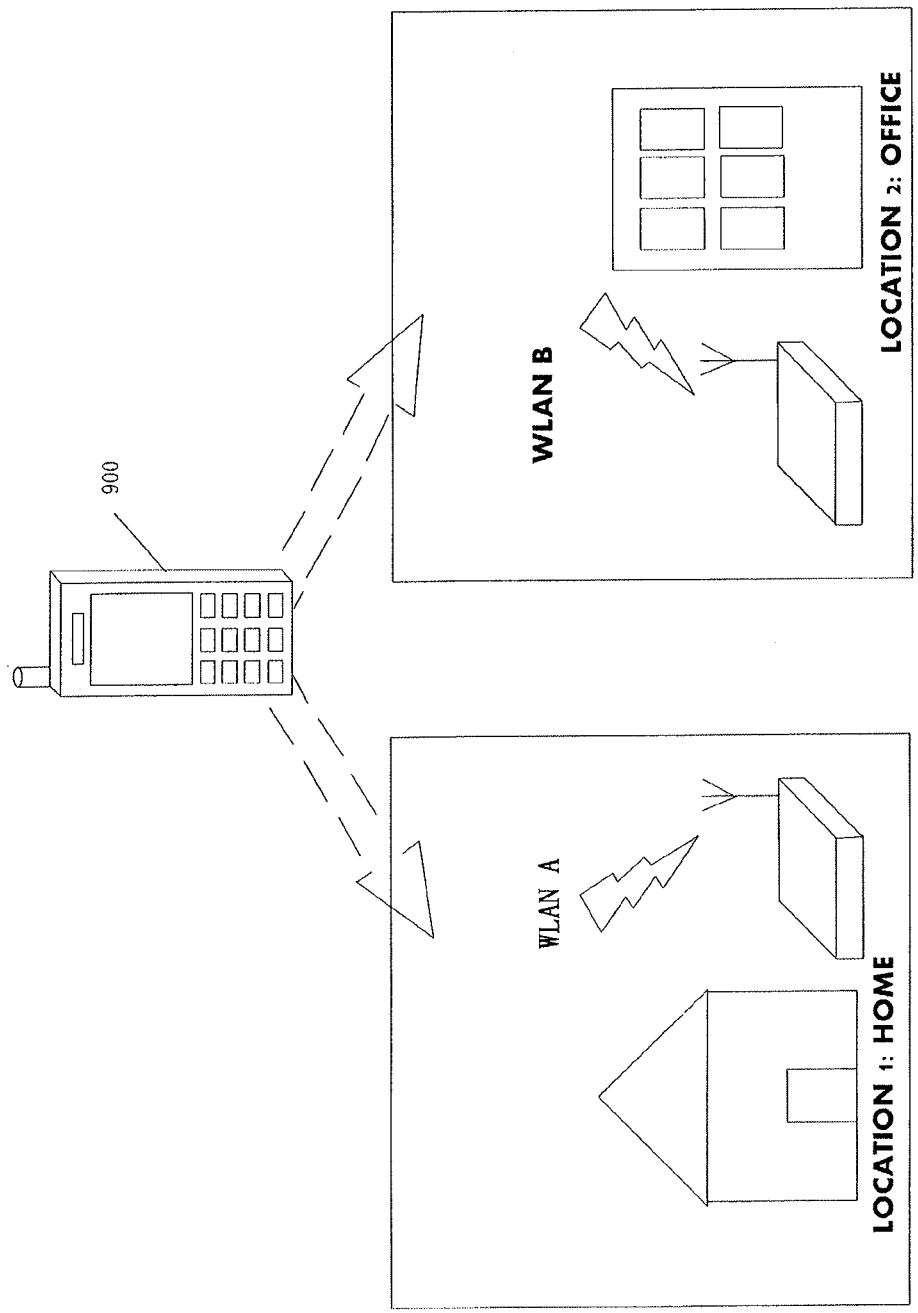
FIG. 2. is a structure diagram of one embodiment of the present invention.

As shown in FIG. 2, a user's mobile phone 900 has a WIFI function, such that LOCATION 1 is a location pre-set by the user as: HOME, and LOCATION 2 is a location per-set by the user as: OFFICE. Both locations are covered by WIFI network A and WIFI network B of WLAN.

It is particularly implemented as follows:

In a first step, after the mobile phone 900 is turned on, for example, the user is at LOCATION 2 and turns on the WIFI function for searching WLAN, so that SSID B of WIFI network B of WLAN in LOCATION 2 (OFFICE) is searched out. (That is, the SSID of the WLAN which corresponds to the specified location is searched out through the mobile phone WIFI, and the SSID is stored.)

In a second step, after SSID B has been searched out, the software of the mobile phone 900 prompts the user whether to activate a location labeling function. If the user chooses "YES", then the software of the mobile phone 900 prompts that the user is able to annotate LOCATION 2. The user may annotate a name for the location (e.g. OFFICE) in his own way. (That is, a location labeling function is activated as required, and a name of the specified location which corresponds to the SSID of the WLAN is annotated.)

The profile which is named as "OFFICE" is defined (change settings for ring tone, volume, and vibration mode), so that the ring tone and the conversation volume are adaptable for the workplace environment. That is, the profile of the mobile phone 900 which corresponds to the name of the specified location of the SSID is set and stored as required, and setting the profile of the mobile phone 900 comprises settings for ring tones, volume, and vibration mode.

In a third step, refer to FIG. 2, according to the method of the above-mentioned, when network A of WLAN is connected in LOCATION 1 and SSID A of WLAN in a house is searched out, the user completes the profile settings of LOCATION 1 and defines a name of the profile as "HOME".

In a fourth step, the mobile phone WIFI is kept activated, the WLAN in the vicinity is searched via the mobile phone 900 at designated times, when the SSID of WLAN is searched out through the mobile phone 900, the software of the mobile phone 900 compares the acquired SSID and the pre-stored SSID, if the result is SSID B, the user is prompted through the mobile phone 900 that the "OFFICE" profile is activated.

If the result is SSID A, the user is prompted through the mobile phone 900 that the "HOME" profile is activated. If the searched SSID is neither SSID A nor SSID B, the user is not prompted and the profile is not switched. That is, when the acquired SSID of the WLAN and the pre-stored SSID are determined to be different, the prompting and switching of the profile of the mobile phone 900 are not activated.

In this case, the profile switching method based on mobile phone WIFI of the present invention, the mobile phone 900 is added a new function which can utilize the mobile phone WIFI to acquire different location labels for switching to corresponding profiles. When the mobile phone 900 is in different locations, automatically switching the profiles which correspond to locations which is pre-set by the user is achieved, and the user is provided convenience.

Figure 3:
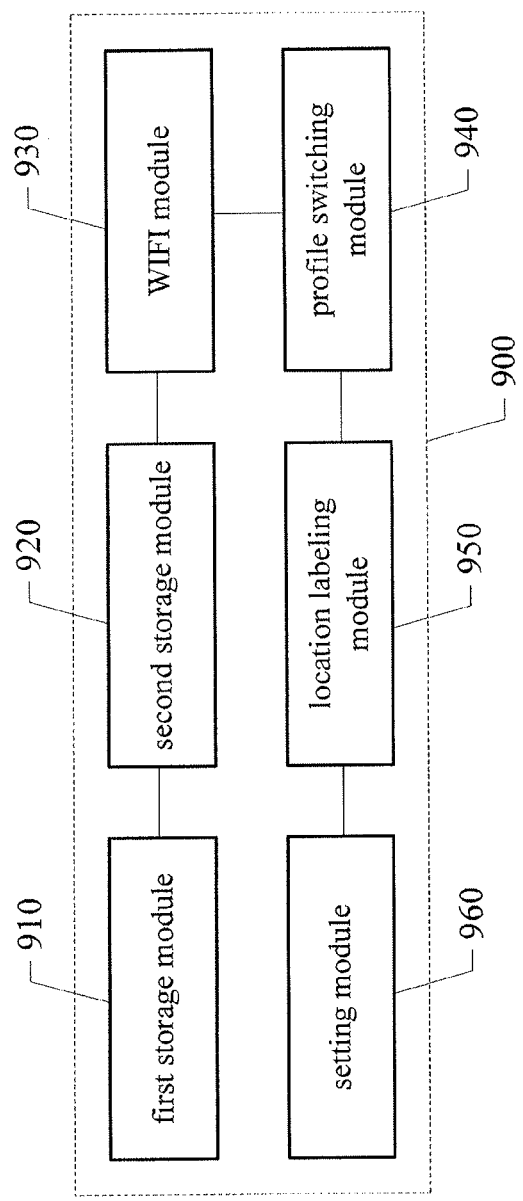
FIG. 3. is a principle diagram of a mobile phone of the present invention.

According to the profile switching method mentioned above, the present invention further provides a mobile phone 900, as shown in FIG. 3, the mobile phone 900 comprises:

a first storage module 910, which is utilized for pre-storing an SSID of a WLAN corresponding to a specified location;

a second storage module 920, which is utilized for storing a profile of the mobile phone 900 corresponding to the SSID of the specified location;

a WIFI module 930, which is utilized for searching a WLAN in the vicinity at designated times through the mobile phone WIFI, and acquiring the SSID of the WLAN;

a profile switching module 940, which is utilized for comparing the acquired SSID of the WLAN and the pre-stored SSID, when the acquired SSID of the WLAN and the pre-stored SSID are determined to be the same, prompting the user and activating the profile of the mobile phone 900 which corresponds to the pre-stored SSID.

The mobile phone 900 further comprises:

A location labeling module 950, which is utilized for activating a location labeling function as required, and annotating a name of the specified location corresponding to the SSID of the WLAN.

A setting module 960, which is utilized for setting and storing the profile of the mobile phone 900 corresponding to the name of the specified location of the SSID as required.

According to the above-mentioned, the present invention utilizes resources of hardware and software, as well as utilizes the different SSIDs of different WLANs which has been searched out for identifying different locations, provides the results to the user, and performs the profiles switched automatically based on the pre-stored settings by the user.

The WLAN which is utilized for labeling location is maintained enabled, and the SSIDs have to be broadcasted by the WLAN. Mobile phones only read the SSIDs to identify the locations, and it is unnecessary to connect to a network, therefore no fees for accessing the network is incurred.

The coverage of WLAN is usually within 10-100 meters, so that the location labeling determination may be achieved, and automatically switching the profiles is also achieved within this range. The user is provided greater convenience.

To sum up, the profile switching method based on mobile phone WIFI which is provided in the present invention utilizes the existing mobile phone WIFI under the controls of the mobile phone software to prompt that the user's mobile phone is in different locations based on the different WIFI connecting statuses, and automatically switching the profiles which correspond to locations which is pre-set by the user is achieved, as well as the user is provided convenience. So that the mobile phone is added a new function which can utilize the mobile phone WIFI to acquire different location labels for switching to corresponding profiles.

The present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A profile switching method based on mobile phone WIFI (wireless fidelity), the method comprising steps of:
   A. pre-storing an SSID (service set identifier) of a WLAN (wireless local area network) corresponding to a specified location, and storing a profile of the mobile phone corresponding to the SSID of the specified location, the profile comprising at least one of ring tone, volume, and vibration mode settings of the mobile phone, wherein step A further comprises:
      activating a location labeling function as required, and annotating a name of the specified location corresponding to the SSID of the WLAN; and
      setting and storing the profile of the mobile phone corresponding to the name of the specified location of the SSID as required;
   B. searching a WLAN in the vicinity at designated times through the mobile phone WIFI, and acquiring the SSID of the WLAN;
   C. comparing the acquired SSID of the WLAN and the pre-stored SSID, when the acquired SSID of the WLAN and the pre-stored SSID are determined to be the same, prompting a user and activating the profile of the mobile phone corresponding to the pre-stored SSID.

2. The switching method of claim 1, wherein step A further comprises:
   searching the SSID of the WLAN corresponding to the specified location through the mobile phone WIFI, and storing the SSID of the WLAN.

3. The switching method of claim 1, wherein, in step C, when the acquired SSID of the WLAN and the pre-stored SSID are determined to be different, prompting and switching of the profile of the mobile phone are not activated.

4. A mobile phone, comprising:
   a first storage module for pre-storing an SSID of a WLAN corresponding to a specified location;
   a second storage module for storing a profile of the mobile phone corresponding to the SSID of the specified location, the profile comprising at least one of ring tone, volume, and vibration mode settings of the mobile phone;
   a WIFI module for searching a WLAN in the vicinity at designated times through the mobile phone WIFI and acquiring the SSID of the WLAN;
   a profile switching module for comparing the acquired SSID of the WLAN and the pre-stored SSID and prompting a user and activating the profile of the mobile phone corresponding to the pre-stored SSID when the acquired SSID of the WLAN and the pre-stored SSID are determined to be the same;
   a location labeling module for activating a location labeling function as required and annotating a name of the specified location corresponding to the SSID of the WLAN; and
   a setting module for setting and storing the profile of the mobile phone corresponding to the name of the specified location of the SSID as required.

5. A mobile phone with a profile switching function based on mobile phone WIFI, the mobile phone comprising:
   a storage module for pre-storing an SSID of a WLAN corresponding to a specified location and storing a profile of the mobile phone corresponding to the SSID of the specified location, the profile comprising at least one of ring tone, volume, and vibration mode settings of the mobile phone;
   a WIFI module for searching a WLAN in the vicinity through the mobile phone WIFI and acquiring the SSID of the WLAN;
   a profile switching module for comparing the acquired SSID of the WLAN and the pre-stored SSID, prompting a user and activating the profile of the mobile phone corresponding to the pre-stored SSID when the acquired SSID of the WLAN matches the pre-stored SSID;
   a location labeling module having a location labeling function, a name of the specified location corresponding to the SSID of the WLAN being permitted to be annotated when the location labeling function is activated; and
   a setting module providing various settings for a user to set for the profile of the mobile phone corresponding to the name of the specified location of the SSID as required and storing the settings set by the user.

* * * * *